Jan. 24, 1956 B. WOLFE 2,732,429

MULTICHANNEL COMMUNICATION CIRCUIT

Filed May 29, 1953 2 Sheets-Sheet 1

INVENTOR

Benjamin Wolfe

BY Paris and Haskell

ATTORNEYS

Jan. 24, 1956 B. WOLFE 2,732,429

MULTICHANNEL COMMUNICATION CIRCUIT

Filed May 29, 1953 2 Sheets-Sheet 2

INVENTOR

Benjamin Wolfe,

BY Paris and Haskell

ATTORNEYS

United States Patent Office 2,732,429

Patented Jan. 24, 1956

2,732,429

MULTICHANNEL COMMUNICATION CIRCUIT

Benjamin Wolfe, Baltimore, Md.

Application May 29, 1953, Serial No. 358,283

8 Claims. (Cl. 179—1)

Figure 1:
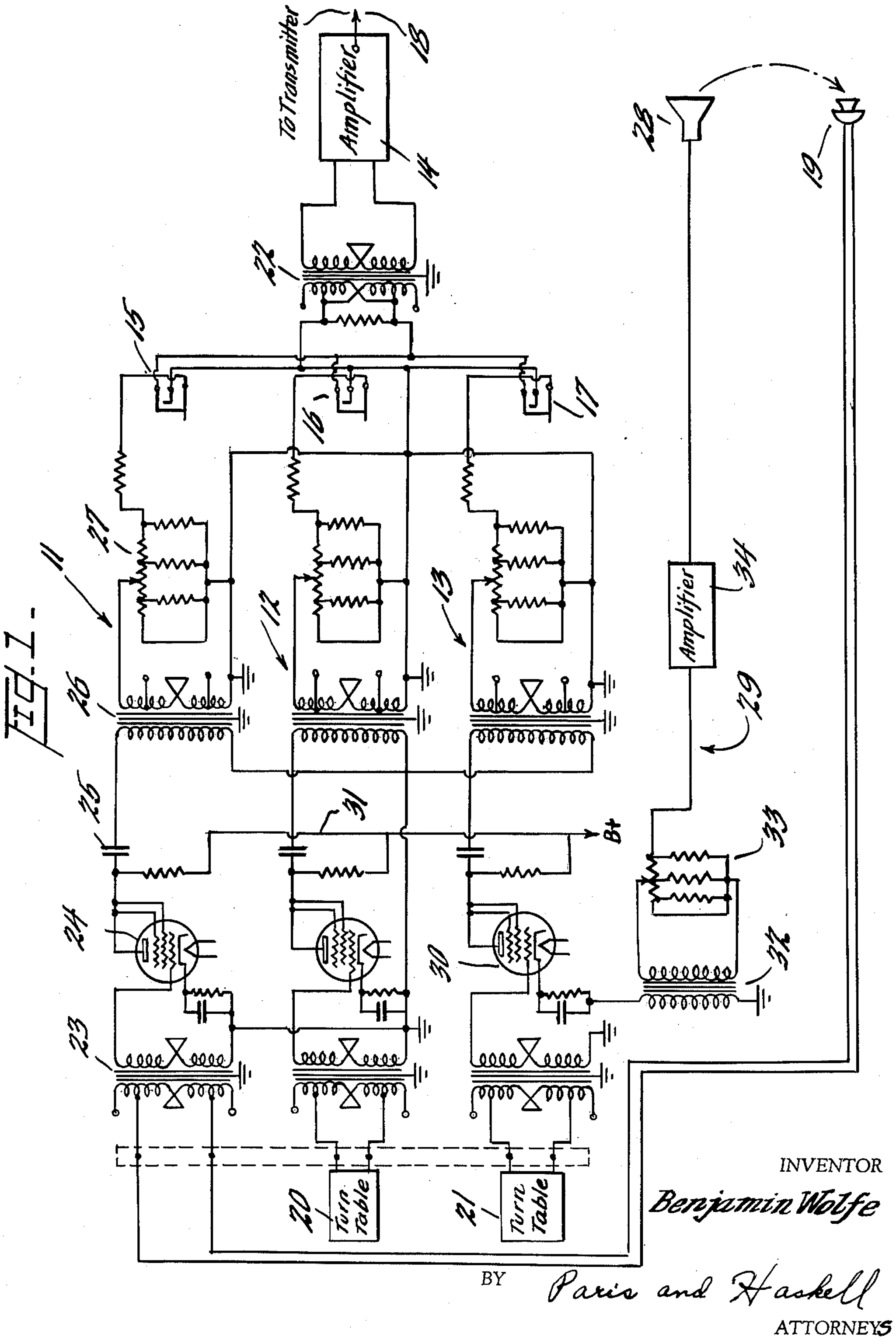

The present invention is concerned generally with the problem of eliminating howling or singing caused by feedback in audio communication circuits, where acoustic coupling exists between output of one channel and input of another channel.

Many audio communication circuits are designed to provide a plurality of interconnected channels for conveying audio intelligence. Frequently it is desired that the acoustic output of one channel, as derived for example from a loudspeaker, be available in the proximity of an input, as a microphone, of another channel. Under these circumstances, if the communication system has an electrical coupling path between the two mentioned channels, the acoustic coupling between the loudspeaker and microphone results in electrical feedback to the first mentioned channel. Unless the communication system is appropriately designed or adequate steps taken, this feedback produces sustained oscillations in the first mentioned channel and causes howling or singing effects in its output.

In radio broadcasting studios, for example, it is frequently desired to transmit recorded music or speech from a studio turntable along with "live" music or speech produced in the studio. In order that the "live" aspects of the program may be properly correlated with the recorded aspects, it is desirable for the recorded intelligence to be played into the studio over a loudspeaker. Since the two aspects of the program are simultaneously conveyed over one multichannel communication system to a single program amplifier on their way to the broadcasting transmitter, appropriate provision must be made to prevent howling or singing in the channel carrying the recorded intelligence, as would otherwise result from acoustic coupling between the loudspeaker and studio microphone. The same problem exists in instances where it is desired to combine with the program taking place at the broadcasting studio, intelligence derived from a remote studio. In this latter instance, the remote intelligence would be applied to one channel of the communication system leading to the program amplifier and broadcasting transmitter, and as in the case of recorded intelligence, would be applied to a loudspeaker in the local studio. The problem in this instance of acoustic coupling from the loudspeaker to the open studio microphone and electrical feedback from the microphone channel to the remote intelligence channel, is the same as in the preceding example of combined recorded and "live" program transmission.

The present invention is consequently concerned with and has for its objects the provision of appropriate circuitry in combination with a multichannel communication system, whereby the acoustic output of one channel may be had within coupling range of the input of another channel of the system, without causing sustained feedback oscillations. Another object of the present invention is to derive an acoustic output from one channel of a multichannel communication circuit by means of the cathode current of an amplifier tube of said channel, in such a manner that this acoustic output may be had within coupling range of the acoustic input of a second channel of the system, without causing sustained feedback oscillations in the first channel.

Figure 2:
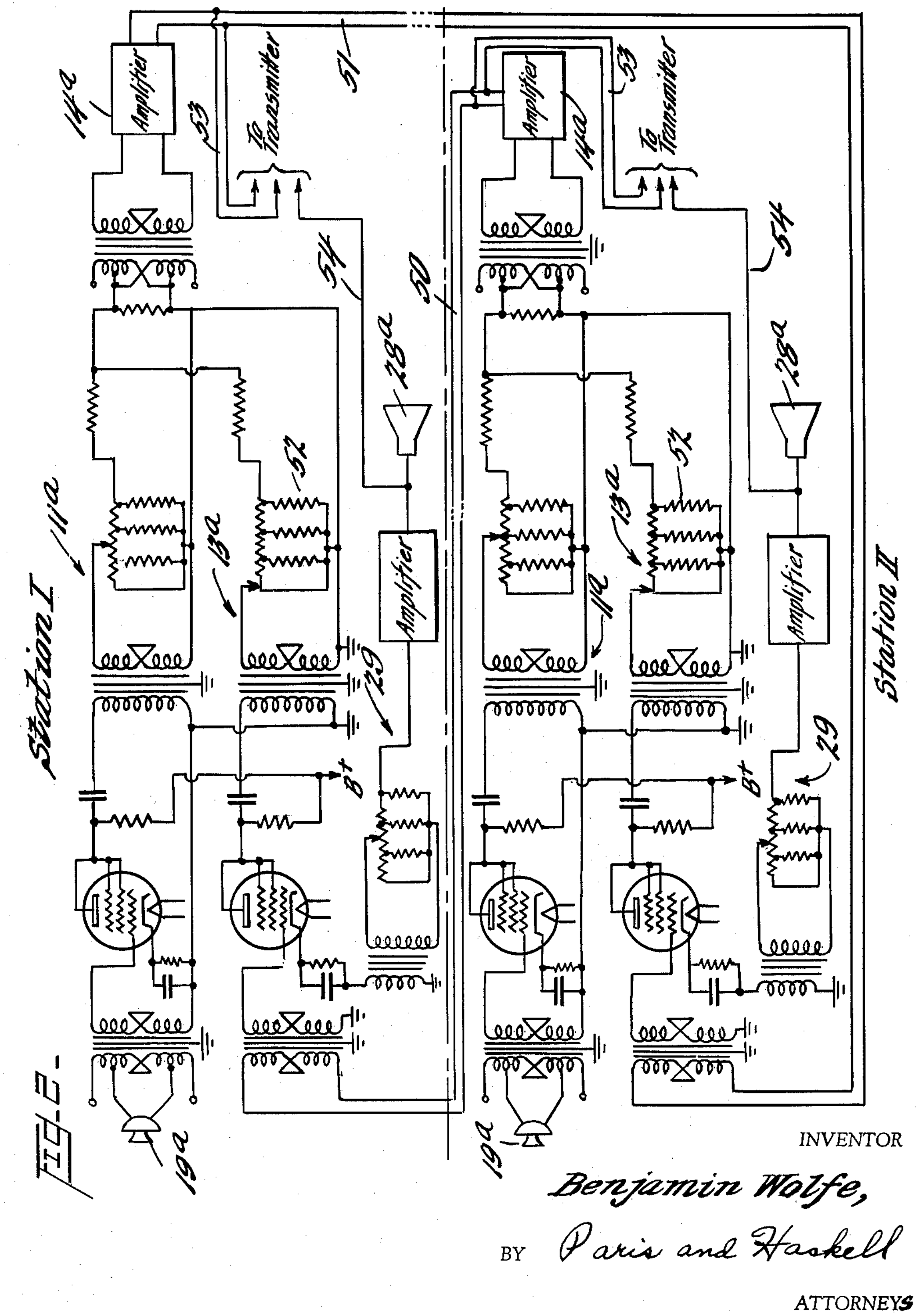

Other objects and advantages of the present invention will be apparent to those skilled in the art from a consideration of the following detailed description of exemplary embodiments of the present invention had in conjunction with the accompanying drawings wherein: Fig. 1 is a schematic wiring diagram of one embodiment of the present invention, and Fig. 2 is a schematic wiring diagram of another embodiment thereof.

Referring to the drawing, there is shown a three channel communication system such as is frequently employed in radio broadcasting studios or the like, comprising channels 11, 12, and 13. Each of these channels may be selectively coupled through their respective control switches 15, 16, and 17 and the common transformer 22 to a program line amplifier 14 and the output 18 thereof to a master control transmitter or the like. Channel 11 has as its input the microphone 19, whereby "live" programs may be fed from the broadcasting studio to a transmitter. Channels 12 and 13 each have as their inputs turntables 20 and 21 respectively, whereby recorded intelligence or programs may be fed to the transmitter.

Considering channel 11 in detail, electrical signals caused by acoustic intelligence picked up by microphone 19 are coupled through transformer 23 to preamplifier 24, and applied to the control grid thereof. The resultant amplified A. C. plate output of tube 24 is coupled through blocking capacitor 25 and transformer 26 to the variable ladder type attenuator 27 for adjusting the gain of preamplifier 24, and through switch 15 and transformer 22 to the program line amplifier 14 and output 18 to the transmitter. Transmission of intelligence along channel 12 is the same as described for channel 11, except that the input therefor is the turntable 20 for supplying recorded intelligence to the program line amplifier 14, output 18, and the transmitter.

In the instance of channel 13, which is supplied with the turntable input 21 as in the case of channel 12, although substantially similar to channels 11 and 12 in transmitting intelligence to the program line amplifier and output 18, differs from the foregoing channels in being coupled to a network 29 for applying the output of turntable 21 to loudspeaker 28 in the broadcasting studio. The purpose of providing network 29 is to enable, in instances where it is desired to provide a program in part recorded and in part "live" and taking place in the studio, optimum correlation of the "live" portions of the program with the recorded portions. Additionally, it is desirable that microphone 19 be maintained open at all times during the program. It is apparent then, with channels 11 and 13 both open and conjointly contributing to the output of program line amplifier 14, that there results an acoustic coupling of the output of the turntable 21, as obtained from the studio loudspeaker 28, into the studio microphone 19. This coupling causes a feedback signal to be developed, through channel 11 and the common B+ supply lead 31, on the plate of preamplifier tube 30 in channel 13. Unless adequate provision is made therefor or an appropriate coupling network 29 provided between channel 13 and the loudspeaker 28, this feedback can cause sustained oscillations in the circuit of preamplifier 30 and result in singing or howling in its output.

Accordingly, the input to network 29 from the preamplifier 30 is effected by inserting a low impedance coupling means such as the primary of a low resistance transformer 32 (for example a 600 ohm/600 ohm transformer) in the cathode circuit of the preamplifier. In this manner variations in the preamplifier cathode current in response to the applied control grid signals cause voltage signals to be developed across the appropriate ladder or fixed type resistor 33 (such as 600 ohm) which are utilized to energize amplifier 34 for driving loudspeaker 28, thus obtaining the desired recorded intelligence over the loudspeaker. The feedback voltage obtained from acoustic coupling of the loudspeaker 28 into microphone 19 is developed on the plate of preamplifier 30. In order to sustain oscillations in the circuit of preamplifier 30, the feedback voltage must be applied and with sufficient energy in phase to the grid of the preamplifier tube. With the feedback voltage applied to the preamplifier plate, it follows that the cathode current must vary therewith; but in the present invention the plate resistance of the preamplifier is large (approximately 12,000 ohms) compared with the impedance of the transformer 32 (600 ohms and degenerative). Under these circumstances insufficient grid voltage is developed to sustain oscillations. Thus, by the present manner of deriving the audio intelligence from turntable 21 for studio loudspeaker 28, howling or singing which would normally result from acoustic coupling between the loudspeaker 28 and microphone 19 is prevented, and the microphone may be maintained open at all times. High levels of audio may be fed into loudspeaker 28, and the loudspeaker may be placed as close as desired to microphone 19 without obtaining howling or singing effects.

The following table shows the frequency characteristics of preamplifier 30 with the network 29 coupled thereto to be substantially flat within 1.5 decibels from 40 to 17,000 cycles:

| Cycles: | Audio volts out |
|---|---|
| 40 | .28 |
| 50 | .3 |
| 70 | .3 |
| 100 | .3 |
| 150 | .31 |
| 200 | .31 |
| 300 | .31 |
| 400 | .32 |
| 500 | .32 |
| 700 | .32 |
| 1000 | .32 |
| 2000 | .32 |
| 3000 | .32 |
| 4000 | .33 |
| 5000 | .33 |
| 6000 | .33 |
| 7000 | .33 |
| 8000 | .33 |
| 9000 | .33 |
| 10,000 | .33 |
| 12,000 | .32 |
| 15,000 | .32 |
| 17,000 | .32 |

The loss brought about by the degenerative effect of transformer 32 is found by the following calculations to be only 2.97 decibels:

$G$=gain of preamplifier 30 without feedback.
$G'$=gain of preamplifier 30 with feedback.
Preamplifier 30 is a 6J7.
$U$=20 amplification factor.
$R_1$=22,000—$Z_p$—primary impedance of transformer 35.
$R_p$=11,000—plate resistance of preamplifier 30.
$R$=600—$Z_p$—primary impedance of transformer 32.

$$G=\frac{UR_1}{R_p+R_1}$$

$$G'=\frac{U(R_c+R_1)}{R_c(U+1)+R_1+R_p}$$

$$G=\frac{20\times 22{,}000}{11{,}000+22{,}000}=\frac{440{,}000}{33{,}000}=13.3$$

$$G'=\frac{20(600+22{,}000)}{600(20+1)+22{,}000+11{,}000}=\frac{452{,}000}{45{,}600}=9.91$$

$$\text{Voltage ratio}=\frac{13.3}{9.91}=1.34=2.97\text{ db loss}$$

From the foregoing it can be seen that there is provided by the present invention an improvement in multichannel communication systems, whereby the audio intelligence in one channel may be delivered over a loudspeaker, or the like, within acoustic coupling range of an open microphone input to a second channel of the same system, without causing howling or singing in the system. And by the above-described specific embodiment of this invention, there is provided a circuit which permits the feeding of turntable music simultaneously to a broadcasting studio loudspeaker and an outgoing line source with the studio microphone open, while preventing howling or singing effects from acoustic feedback. This system does not limit the audio power output or the frequency range; high levels of audio may be fed into the loudspeaker without causing sustained oscillations. The circuit does not require any switching by means of an operator, does not depend on maintaining critical impedance match in a balanced network over the audio frequency spectrum, and the insertion loss is limited to three decibels.

As is readily apparent, inputs to channel 13 other than the turntable 21 may be employed. For example a remote program or the like may be wired to the input of channel 13, and by use of the present network 29 may be transmitted into the local studio over speaker 28, while microphone 19 is open to permit local participation in the remote program.

Further, as specifically illustrated in Fig. 2, the teachings of the present invention enable the ready employment of conventional broadcasting studio circuiting for providing a program composed of simultaneous contributions from a plurality of broadcasting stations. In Fig. 2 there is shown the pertinent internal circuiting of two broadcasting stations, station I and station II, each comprising two communication channels **11*a* and 13*a*, corresponding to channels 11 and 13 of Fig. 1, with means for feeding the audio intelligence therein to their respective program line amplifiers 14*a*. The input to each channel 11*a* is its studio microphone 19*a*. The input to channel 13*a* of station I is the output of station II program line amplifier 14*a* obtained over line 50, which may be a telephone line linking the two stations; while the input to channel 13*a* of station II is the output of station I program line amplifier 14*a* obtained over line 51. As in the case of channel 13 of Fig. 1, each channel 13*a* has a network 29 coupled thereto, and described above, for deriving acoustic outputs from channels 13*a* over the respective studio loudspeakers 28*a*. Channels 13*a* of Fig. 2 differ from channels 13 of Fig. 1 in that in the former coupling of channels 13*a* to their respective program line amplifiers is eliminated, as may be most easily effected by placing variable attenuators 52 in their maximum attenuated position. By this interconnection of station I with station II, the acoustic input to microphone 19*a* at station I is available as the acoustic output of loudspeaker 28*a* at station II; and similarly, the acoustic input to microphone 19*a* at station II is available as the acoustic output of loudspeaker 28*a* at station I. Thus, a program may be conducted with simultaneous participation from both stations, and the contributions from each station is available at the other. As fully explained above, the acoustic outputs of loudspeakers 28*a* may be had within coupling range of microphones 19*a* while the microphones are maintained in open condition, without causing singing or howling in the circuits due to sustained feedback oscillations. By the present circuit there is thus permitted as free and unhampered an exchange of intelligence between the two stations as if all participants were in one studio. The entire combined program may be applied to the transmitter of one or both stations by combining the output of the station program line amplifier 14*a* had over line 53 with the output of network 29 had over line 54** in a conventional manner.

Although the present application of the invention is specifically described with relation to two broadcasting stations, it is apparent that any number of broadcasting stations may be so interconnected, it merely being necessary to provide the appropriate number of channels 13*a* and associated networks 29 at each station. Also, as is apparent, the same circuiting may be employed to provide a program composed of contributions from a plurality of studios within a single broadcasting station, if desired. Additionally, by employment of the present teachings, the existing conventional internal circuits of broadcasting stations may be employed in accordance with the showing of Fig. 2 to provide inter-station communication or inter-studio communication within a single station in the absence of radio transmission, by elimination of the coupling to the station transmitter.

Other uses and modifications of the present invention will be apparent to those skilled in the art. It is therefore not intended to limit the scope of the present invention to the details of the instant specific embodiment, but such modifications as are within the spirit and scope of the appended claims are contemplated by the present invention.

I claim:

1. In an audio communication circuit having a plurality of interconnected channels for conveying intelligence from different sources, an amplifier in each of said channels, an acoustic input means for one channel, and an acoustic output means for another channel, said input means and output means being positioned within acoustic coupling range the amplifier in the second mentioned channel having a plate, grid, and cathode; an input circuit to said grid and an output circuit from said cathode, said grid and cathode circuits being also connected to a common point, a network in said cathode output circuit between the cathode and said common point for applying the audio intelligence in said second mentioned channel to said acoustic output means, said network comprising a low resistance transformer in said cathode output circuit, and means responsive to the transformer output for driving said acoustic output means, whereby feedback to the second mentioned channel amplifier plate circuit caused by acoustic coupling between said output means and said input means does not cause sustained oscillations.

2. In an audio communication circuit having a plurality of interconnected channels for conveying intelligence from different sources, an amplifier in each of said channels, an acoustic input means for one channel, and an acoustic output means for another channel the amplifier in the second mentioned channel having a plate, grid, and cathode; an input circuit to said grid and an output circuit from said cathode, said grid and cathode circuits being also connected to a common point, a network in said cathode output circuit between the cathode and said common point for applying the audio intelligence in said second mentioned channel to said acoustic output means, said network comprising a low resistance inductive coupling means in said output circuit, and means responsive to said coupling means for driving said acoustic output means, whereby the presence of feedback to the second mentioned channel amplifier plate circuit in instances of acoustic coupling between said output means and said input means does not cause sustained oscillations.

3. In an audio communication circuit having a plurality of interconnected channels for conveying intelligence from different sources, an amplifier in each of said channels, an acoustic input means for one channel, and an acoustic output means for another channel the amplifier in the second mentioned channel having a plate, grid, and cathode; an input circuit to said grid and an output circuit from said cathode, said grid and cathode circuits being also connected to a common point, a network in said cathode output circuit between the cathode and said common point for applying the audio intelligence in said second mentioned channel to said acoustic output means, said network comprising a low impedance coupling means in said cathode output circuit responding to second mentioned channel amplifier input signals, and means responsive to said coupling means for driving said acoustic output means, whereby the presence of feedback to the second mentioned channel amplifier plate circuit in instances of acoustic coupling between said output means and said input means does not cause sustained oscillations.

4. An audio communication circuit comprising a plurality of interconnected communication channels, individual input means and a common output means for said channels, the input means for a first of said channels being of the acoustic type, a second output means of the acoustic type for a second of said channels, an amplifier in each of said channels, the amplifier in the second mentioned channel having a plate, grid, and cathode, an input circuit to said grid and an output circuit from said cathode for said second output means, said grid and cathode circuits being also connected to a common point, a low impedance coupling means in said cathode output circuit between said cathode and said common point responding to said second channel amplifier input signals, and means responsive to said coupling means for driving said acoustic output means, whereby the presence of feedback to the second channel amplifier plate circuit in instances of acoustic coupling between said acoustic output means and said acoustic input means does not cause sustained oscillations.

5. In an audio communication circuit having a plurality of interconnected channels for conveying intelligence from different sources to a common output, an amplifier in each of said channels, an acoustic input means for one channel, and an additional output means of the acoustic type for another channel the amplifier in the second mentioned channel having a plate, grid, and cathode; an input circuit to said grid and an output circuit from said cathode, said grid and cathode circuits being also connected to a common point, a network in said cathode output circuit between the cathode and said common point for applying the audio intelligence in said second mentioned channel to said acoustic output means, said network comprising a low impedance coupling means in said cathode output circuit responding to second mentioned channel amplifier input signals, and means responsive to said coupling means for driving said acoustic output means, whereby the presence of feedback to the second mentioned channel amplifier plate circuit in instances of acoustic coupling between said acoustic output means and said input means does not cause sustained oscillations.

6. In an inter-station communication circuit having at each station a plurality of channels adapted to convey audio intelligence from separate inputs to a common output, an amplifier in each of said channels, an acoustic input to one channel at each station, and an additional output means of the acoustic type for another channel at each station the amplifier in the second mentioned channel of each station having a plate, grid, and cathode; an input circuit to each said grid and an output circuit from each said cathode, said grid and cathode circuits in each respective channel being also connected to a common point, a network in each said cathode output circuit between the cathode and said common point thereof for applying the audio intelligence in the respective second mentioned channel to the respective acoustic output means, said network comprising a low resistance transformer in said cathode output circuit, and means responsive to the transformer output for driving said acoustic output means, means coupling the common output of each station to the second mentioned channel of the other station, and means in the second mentioned channel of each statio for attenuating the audio intelligence therein prior to coupling to the common output, whereby free interchange of audio intelligence may be had between the two stations, and the presence of feedback to the second mentioned channel amplifier plate circuit in instances of acoustic coupling between said acoustic output means and said acoustic input means at a station does not cause sustained oscillations.

7. In an inter-station communication circuit having at each station a plurality of channels adapted to convey audio intelligence from separate inputs to a common output, an amplifier in each of said channels, an acoustic input to one channel at each station, and an additional output means of the acoustic type for another channel at each station, the amplifier in the second mentioned channel of each station having a plate, grid, and cathode; an input circuit to each said grid and an output circuit from each said cathode, said grid and cathode circuits in each respective channel being also connected to a common point, a network in each said cathode output circuit between the cathode and said common point thereof for applying the audio intelligence in the respective second mentioned channel to the respective acoustic output means, said network comprising a low impedance coupling means in said cathode output circuit, and means responsive to said coupling means for driving said acoustic output means, means coupling the common output of each station to the second mentioned channel of the other station, and means in the second mentioned channel of each station for effectively decoupling the audio intelligence therein from the common output, whereby free interchange of audio intelligence may be had between the two stations, and the presence of feedback to the second mentioned channel amplifier plate circuit in instances of acoustic coupling between said acoustic output means and said acoustic input means at a station does not cause sustained oscillations.

8. In an audio communication circuit as set forth in claim 3, and further having an acoustic input means for the second mentioned channel, and an acoustic output means for the first mentioned channel, the amplifier in the first mentioned channel having a plate, grid, and cathode; an input circuit to said last mentioned grid and an output circuit from the last mentioned cathode, said last mentioned grid and cathode circuits being also connected to a common point, a network in said last mentioned cathode output circuit between the last mentioned cathode and said last mentioned common point for applying the audio intelligence in said first mentioned channel to said last mentioned acoustic output means, said last mentioned network comprising a low impedance coupling means in the last mentioned cathode output circuit responding to input signals to the amplifier of the first mentioned channel, and means responsive to said last mentioned coupling means for driving said last mentioned acoustic output means, whereby the presence of feedback to the amplifier plate circuit of the first mentioned channel in instances of acoustic coupling between said last mentioned output means and said last mentioned input means does not cause sustained oscillations.

References Cited in the file of this patent

UNITED STATES PATENTS

| | | |
|---|---|---|
| 2,157,178 | Kellogg | May 9, 1939 |
| 2,189,306 | Anderson | Feb. 6, 1940 |
| 2,199,220 | French | Apr. 30, 1940 |
| 2,200,461 | Varley | May 14, 1940 |
| 2,208,160 | McCreary | July 16, 1940 |